(12) United States Patent
Lim

(10) Patent No.: US 10,923,890 B2
(45) Date of Patent: Feb. 16, 2021

(54) HEAT EXHAUST AND DUSTPROOF SYSTEM OF MULTI-STAGE DISTRIBUTING BOARD

(71) Applicant: LSIS CO., LTD., Anyang-si (KR)

(72) Inventor: Changsoo Lim, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 16/593,627

(22) Filed: Oct. 4, 2019

(65) Prior Publication Data

US 2020/0212657 A1 Jul. 2, 2020

(30) Foreign Application Priority Data

Dec. 28, 2018 (KR) .................. 10-2018-0172742

(51) Int. Cl.
*H02B 1/56* (2006.01)
*H02B 1/28* (2006.01)

(52) U.S. Cl.
CPC .................. *H02B 1/56* (2013.01); *H02B 1/28* (2013.01)

(58) Field of Classification Search
CPC .................................. H02B 1/565; H02B 1/28
See application file for complete search history.

(56) References Cited

U.S. PATENT DOCUMENTS

| 1,955,287 A * | 4/1934 | Graves, Jr. ............. H02B 1/202 |
| | | 361/609 |
| 8,451,589 B2 * | 5/2013 | Milovac ................. H02B 11/26 |
| | | 361/611 |
| 2017/0256922 A1 | 9/2017 | Rajauria et al. |
| 2018/0090914 A1 * | 3/2018 | Johnson ................. H02B 1/565 |

FOREIGN PATENT DOCUMENTS

| JP | 2002151874 A | 5/2002 |
| JP | 2007-221878 A | 8/2007 |
| KR | 200411963 | 3/2006 |
| KR | 20150076392 A | 7/2015 |
| KR | 10-1570982 B1 | 11/2015 |

OTHER PUBLICATIONS

Korean Office Action for related Korean Application No. 10-2018-0172742; action dated Apr. 9, 2020; (4 pages).
Notice of Allowance in corresponding KR Application No. 10-2018-0172742, dated Sep. 29, 2020 (2 pages).

* cited by examiner

*Primary Examiner* — Mukundbhai G Patel
(74) *Attorney, Agent, or Firm* — K&L Gates LLP

(57) ABSTRACT

A heat exhaust and dustproof system of a multi-stage distributing board according to an embodiment of the present disclosure includes: multiple compartments provided at a cabinet of a distributing board; and multiple flaps provided at each of the multiple compartments, wherein the flaps are provided with multiple outlets for heat emission.

9 Claims, 5 Drawing Sheets

HEAT EXHAUST AND DUSTPROOF SYSTEM OF MULTI-STAGE DISTRIBUTING BOARD

CROSS-REFERENCE TO RELATED APPLICATION

Pursuant to 35 U.S.C. § 119(a), this application claims the benefit of earlier filing date and right of priority to Korean Application No. 10-2018-0172742, filed on Dec. 28, 2018, the contents of which is incorporated by reference herein in its entirety.

FIELD OF THE INVENTION

The present disclosure relates to a heat exhaust and dustproof system of a multi-stage distributing board, and particularly, to a heat exhaust and dustproof system of a multi-stage distributing board with smooth heat emission inside the is distributing board and excellent waterproof and dustproof functions.

BACKGROUND OF THE INVENTION

In general, distributing boards are devices used for monitoring, controlling, and protecting the power system, where several electrical devices, such as breakers and current transformers, are used for operation, control, operation of power stations, sub-stations, etc.

When arcs are caused by short circuits, ground faults, or insulation failures inside such distributing boards, high temperature and high pressure arc gases are generated inside the distributing board. The distributing board has to be capable of rapidly discharging high-temperature, high-pressure arc gas generated by such accidents to the outside to protect the power equipments of the distributing board and life.

In addition, the distributing board has to prevent foreign substances from entering the room to maintain stable operation of the internal equipments.

In addition to the test items for the high-pressure distributing board according to IEEE C37.20.2, there are also temperature tests, arc resisting tests and IP (Ingress Protection) tests. The temperature test defines the internal temperature for heat generated by high voltage and high current flow within the high voltage distributing board. The internal arc test is a test to verify that the arc generated by the simulated short circuit accident inside the high voltage distributing board can be released smoothly to the outside of the high pressure distributing board. The IP test shall have various tests according to IP grade and shall be protected from solid or liquid of a certain size.

Thus, ducts are installed on the distributing board to form the path through which arc gas is discharged. Arc gases generated from inside the distributing board are discharged to the outside through the outlet or door on the distributing board.

On the other hand, the distributing board shall be equipped with waterproof and dustproof functions to prevent dust, foreign substances, or moisture from invading.

In particular, the multi-stage distributing board with a multi-stage breaker compartment is complex in its structure, so such heat-discharge, water-proof and dust-proof functions should be examined more closely.

FIGS. 1 and 2 illustrate the multi-stage distributing board structure according to conventional art.

The distributing board 1 according to conventional art is equipped with a first circuit breaker compartment 2 at the bottom, a second circuit breaker compartment 3 at the top, and a bus bar compartment (Mid Compartment) 4 and a cable compartment 5 provided at the rear side of the first and second circuit breaker compartments 2 and 3. A low voltage compartment 6 is installed in the middle of the first and second circuit breaker compartments 2 and 3.

Such a distributing board is provided with a flap 7 to allow arc and heat to be emitted. The flap 7 is rotatably installed and opened by its pressure in the event of an arc, allowing the arc to be discharged to the outside.

However, such a flap 7 is usually closed, which is a disadvantageous structure for heat emission. This means that each circuit breaker compartment 2, 3 is enclosed by the flap 7, making it difficult for the heat inside to escape to the outside, thereby increasing the internal temperature. Accordingly, it is difficult to secure the temperature performance of specification IEEE C37.20.2.

On the other hand, there is a distributing board where, although not separately shown, an opening is formed instead of the flap 7 being fitted for heat emission in the distributing board according to the conventional art. In this case, the heat emission function is usually effective, but the waterproof and dustproof functions are insufficient.

SUMMARY OF THE INVENTION

Therefore, an aspect of the detailed description is to provide a multi-stage distributing board with effective heat emission and waterproof and dust proof functions in a normal state.

To achieve these and other advantages and in accordance with the purpose of this specification, as embodied and broadly described herein, a heat exhaust and dustproof system of a multi-stage distributing board includes: multiple compartments provided at an enclosure of a distributing board; and multiple flaps provided at each of the multiple compartments, wherein the flaps are provided with multiple outlets for heat emission.

Here, the multiple compartments may include a first compartment to be installed in the first stage and a second compartment to be installed in the second stage.

The heat exhaust and dustproof system of a multi-stage distributing board may further include a heat discharge compartment installed between the first and second compartments, with openings formed on both sides.

In addition, the multiple compartments may include a first region surrounded by an upper panel of an upper section, two side panels at both sides, a terminal panel of the rear section, a cradle panel of the bottom, and a breaker door of the front; a second region surrounded by the upper panel, the side panels, a rear panel of the rear section, a lower panel of a lower section, the terminal panel of the front section; and a third region surrounded by the cradle panel of the upper section, the side panels, the terminal panel of the rear section, the lower panel of the lower section, and the breaker door of the front.

In addition, of the multiple flaps, the flap formed in the first and second regions of the first compartment may be connected to the heat discharge compartment.

The outlet may also include a heat discharge hole which is formed at part of the flap and a cover part which covers the heat-discharge hole.

In addition, one end of the cover part may be extended from one side of the heat discharge hole and the other end may be separated from the other side of the heat discharge hole.

In addition, the outlet may be formed on each of the cradle panel, terminal panel and rear panel.

In addition, the outlet formed on the terminal panel and the rear panel may be formed such that the cover part is protruded outward and that the opening of the cover part faces downward.

In addition, the length of the cover may be longer than the length of the heat discharge hole.

According to the heat exhaust and dustproof system of a multi-stage distributing board in accordance with each embodiment of the present disclosure, the outlet for each flap is prepared to effectively perform the heat discharge function under normal conditions.

In addition, the outlets are also provided on each panel, which is effective for heat emission.

In addition, in the event of an arc, the flap is opened so that arc pressure and heat can be discharged within a short period of time.

In addition, the heat discharge holes formed in the flap are covered by the flap, thus minimizing foreign matter or water penetration.

DETAILED DESCRIPTION OF THE INVENTION

Hereinafter, preferred embodiments of the present invention will be described with reference to the accompanying drawings, so that a person skilled in the art can easily carry out the invention. It should be understood that the technical idea and scope of the present invention are not limited to those preferred embodiments.

Referring to the accompanying drawings, description will be given in detail of a heat exhaust and dustproof system of a multi-stage distributing board according to each embodiment of the present disclosure.

The heat exhaust and dustproof system of a multi-stage distributing board in accordance with one embodiment of the present disclosure includes multiple circuit breaker compartments 12 and 13 provided on a distributing board enclosure 11, and multiple flaps 43 and 44 each provided at the multiple breaker compartments 12 and 13, and multiple outlets 50 and 51 for discharging heat are formed at the flaps 43 and 44.

Figure 1:
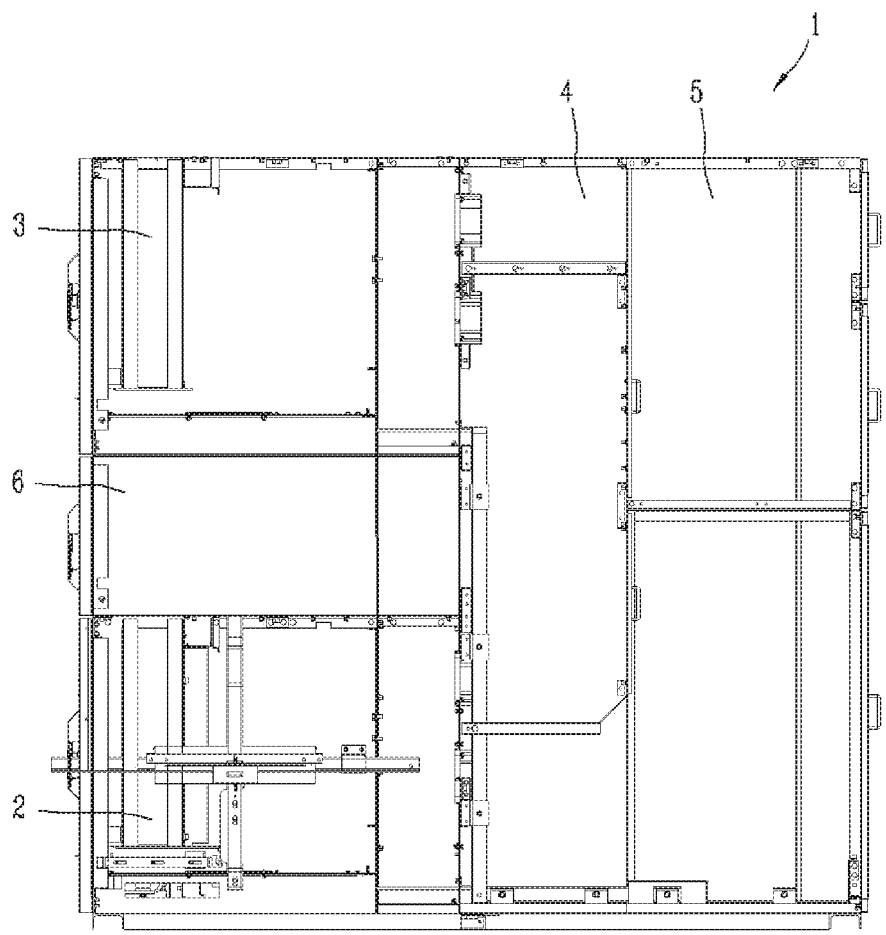
FIGS. 1 and 2 are an internal lateral view and a perspective view of a multi-stage distributing board according to the conventional art.
Figure 2:
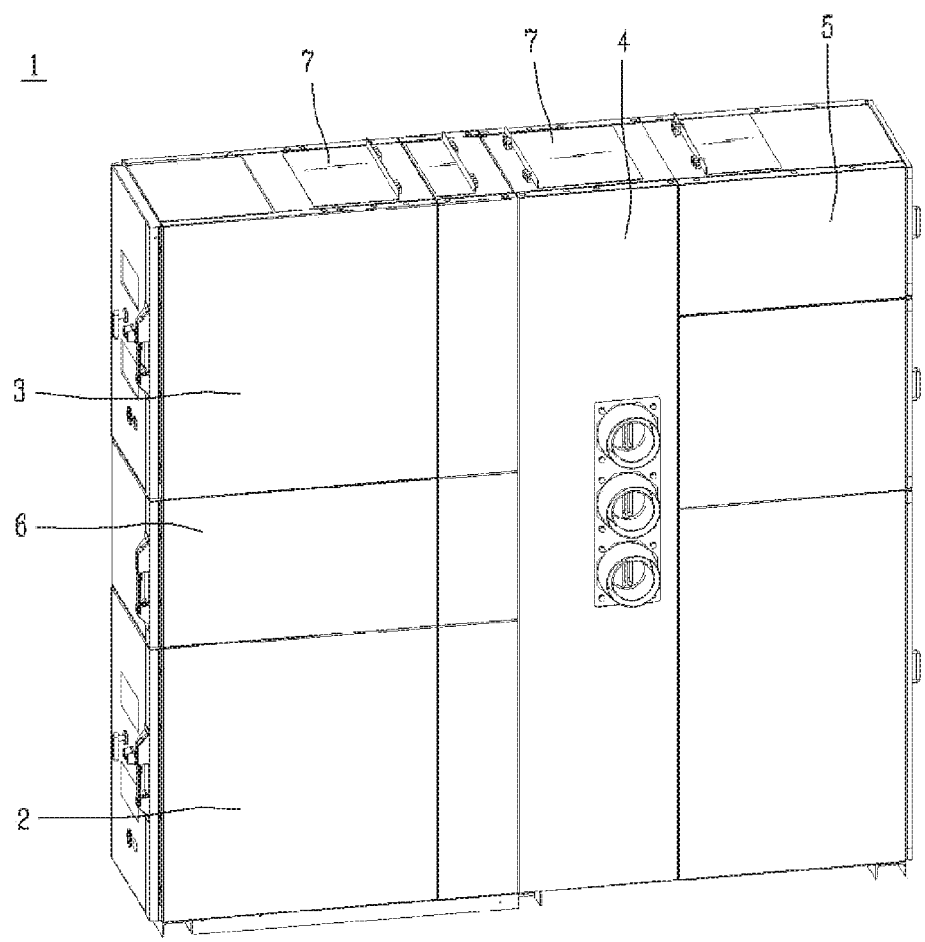
Figure 3:
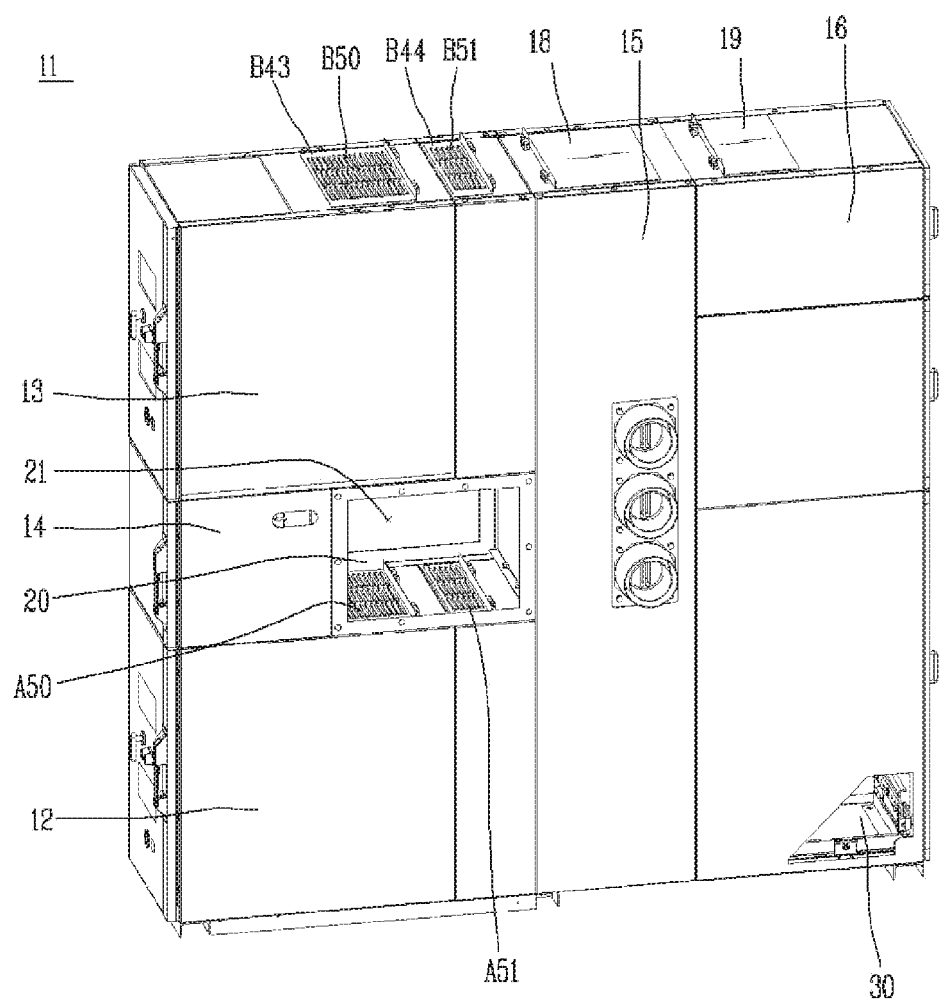
FIG. 3 is a perspective view of a multi-stage distributing board in accordance with the present disclosure.
Figure 4:
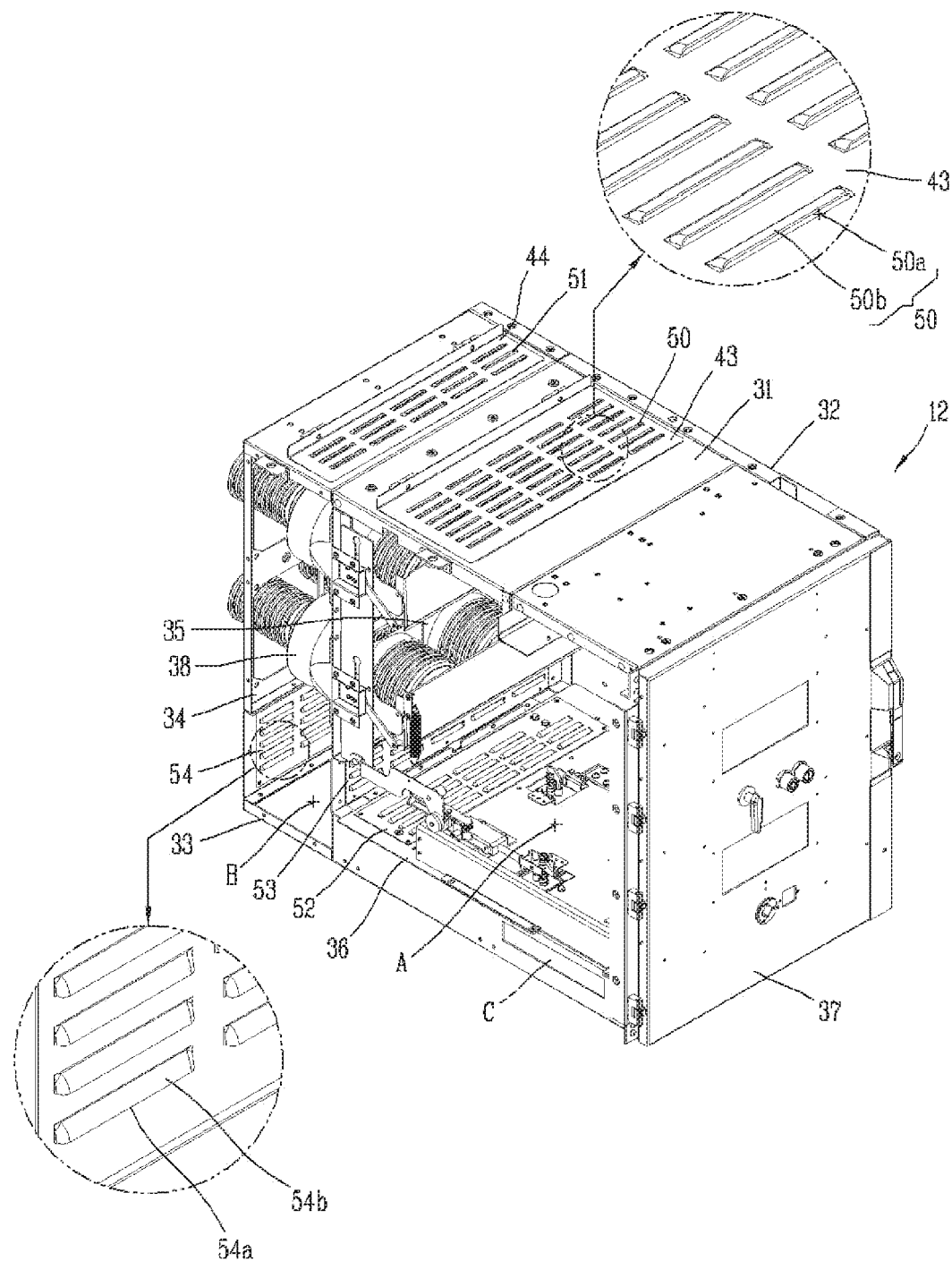
FIGS. 4 and 5 are perspective views of a circuit breaker compartment applied to the multi-stage distributing board in accordance with one embodiment of the present disclosure.
Figure 5:
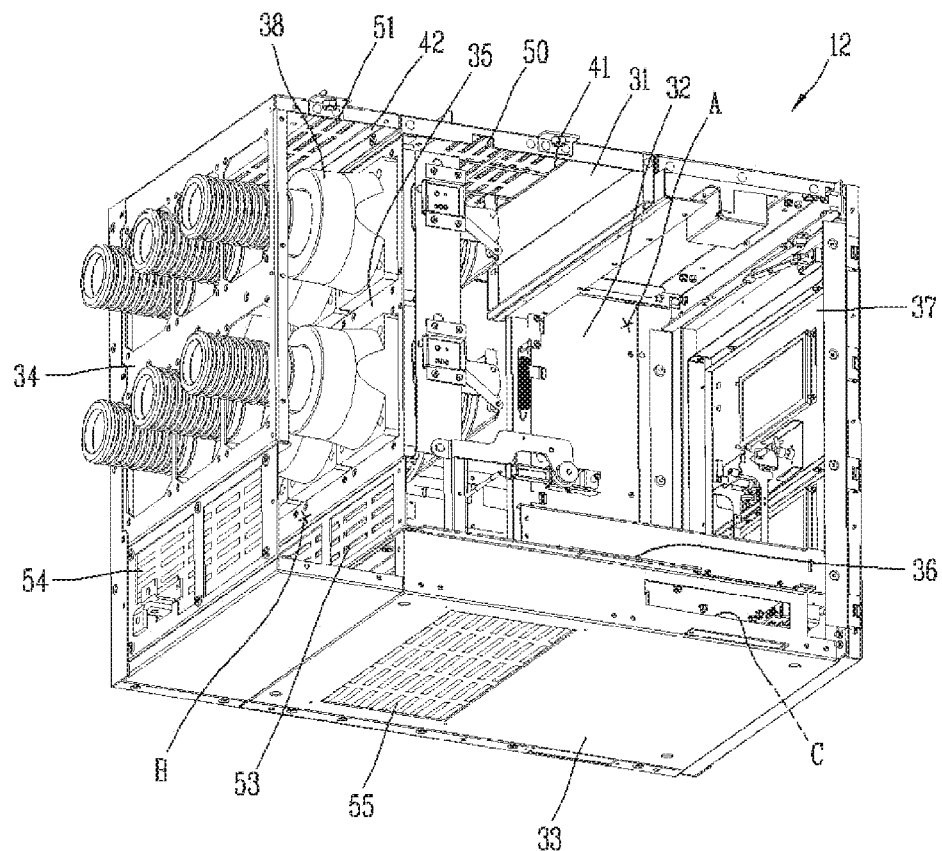

Referring first to FIGS. 3 through 5, in which FIG. 3 is a perspective view of a multi-stage distributing board in accordance with the present disclosure, and FIGS. 4 and 5 are perspective views of a circuit breaker compartment applied to the multi-stage distributing board in accordance with one embodiment of the present disclosure.

Described first is the enclosure 11 which is subdivided into multiple compartments. Examples of the enclosure 11 may include circuit breaker components 12 and 13, a low voltage compartment 14, a bus bar compartment (Mid Compartment) 15, and a cable compartment 16.

The multi-stage distributing board includes circuit breaker compartments 12 and 13 located at two or more stages, respectively. The circuit breaker compartment installed at the first stage (bottom) of the enclosure 11 is called a first circuit breaker compartment 12, and the breaker compartment installed at the second stage (top) is referred to as a second circuit breaker compartment 13. In the first and second circuit breaker compartments 12 and 13, the circuit breaker and the cradle are accommodated, respectively. The breaker and cradle are not shown in the drawings. (Although the description in this embodiment specifically describes each compartment as a circuit breaker compartment and a low voltage compartment, each compartment may be used for other purposes as well. Therefore, in the case of a general expression of the above-mentioned first and second circuit breaker compartments, it may be called the first and second compartments.)

The low voltage compartment 14 is provided between the first and second circuit breaker compartments 12 and 13. At this time, the low voltage compartment 14 may be formed shorter than the length (forward to rearward length) of the first and second circuit breaker compartments 12 and 13. The low voltage compartment 14 may be equipped with devices for low voltage or transformers and converters for instruments, or additional equipments.

The bus bar compartment 15 and the cable compartment 16 are arranged sequentially on the rear of the first and second circuit breaker compartments 12 and 13.

A heat discharge compartment (or the first arc induction compartment) 20 is arranged on the intermediate stage between the first and second circuit breaker compartments 12 and 13. The heat discharge compartment 20 may be provided at the same height as the low voltage compartment 14. The heat discharge compartment 20 is prepared between the low voltage compartment 14 and the bus bar compartment 15. This is to ensure that the heat discharge compartment 20 is located near the terminal located at the rear side of the circuit breaker (not shown). The heat discharge compartment 20 is in contact with the low voltage compartment 14 installed in the front, the first circuit breaker compartment 12 installed in the lower part, and the second circuit breaker compartment 13 installed in the upper part.

The left and right sides of the heat discharge compartment 20 are opened. In other words, the left and right sides of the heat discharge compartment 20 are each formed with an opening 21. Accordingly, the heat discharge compartment 20 not only receives heat and arc gases, but also becomes a passageway for flow to the left and right sides. When multiple distributing boards are disposed in parallel (sometimes referred to as the heating plate), heat or arc gas will flow through this heat discharge compartment 20.

Described will be the breaker compartments 12 and 13. For the structure of each breaker compartment, most of the items may be applied equally. First of all, the first breaker compartment 12 will be described.

The first breaker compartment 12 may consist of multiple panels (plates). For example, the first breaker compartment 12 includes an upper panel 31 disposed at an upper part, side panels 32 disposed at both sides, a lower panel 33 disposed at a lower part, a rear panel 34 disposed at a rear face, a terminal panel 35 and a cradle panel 36 disposed at the middle. Here, the terminal panel 35 is disposed at the front of the rear panel 34, to which terminal bushings 38 in each phase are fixed. In addition, the cradle panel 36 is disposed at the top of the lower panel 33 and supports the breakers (not shown) and the cradle (not shown).

Meanwhile, a breaker door 37 is provided at the front face. The user can open the breaker door 37 and insert or withdraw the breaker and cradle.

A first region (A) surrounded by the upper panel 31, the side panels 32, the terminal panel 35, the cradle panel 36, and the breaker door 37 in the first breaker compartment 12 may be the breaker compartment in the narrow meaning. The first region (A) is the space where breakers and cradles are stored. Thus, the first region (A) is the space where arcs may occur directly. It is also the place where heat is generated.

A second region (B) surrounded by the upper panel 31, the side panels 32, the rear panel 34, the lower panel 33, and the terminal panel 35, in the first breaker compartment 12, is the space where the inner terminal (e.g. the terminal of the cradle) and the outer terminal (e.g. the power terminal or load terminal) are connected and disposed. Therefore, the second region (B) is the space where heat from each terminal remains.

A third region (C) surrounded by the cradle panel 36, the side panels 32, the terminal panel 35, the lower panel 33, and the breaker door 37, in the first breaker compartment 12, is the space where the additional parts of the cradle are disposed. The third region (C) is the space affected by arcs or heat that occur in the first and second regions (A) and (B).

Multiple openings 41 and 42 are formed on the upper panel 31, and flaps 41 and 42 are installed on each opening 43, 44. In this case, the openings 41 and 42 may be formed in the first and second regions (A) and (B), respectively.

Of the above flaps 43 and 44, the flap installed in the first region (A) is called a first flap 43 and the flap installed in the second region (B) is called a second flap. The first flap 43 and the second flap 44 are rotatably installed on the upper panel 31. For example, the first flap 43 and the second flap 44 may be combined by a hinge in a rotatable manner.

A plurality of outlets 50 and 51 is formed on each of the flaps 43 and 44. The outlets 50 and 51 may be arranged in multiple rows and multiple columns. At this time, the outlet 50 may include a heat discharge hole 50a formed on the flap 43 and a cover part 50b covering the heat discharge hole 50a. A convex type of cover part 50b is formed on one side adjacent to the heat discharge hole 50a. For example, the cover part 50b may be formed so that the edge is separated from the other side of the heat discharge hole 50a. The cover part 50b of the heat discharge hole 50a is provided for each heat discharge hole 50a.

Accordingly, the heat inside the first breaker compartment 12 passes through the heat discharge hole 50a and the cover part 50b to the outside. This structure of the cover part 50b and the heat discharge hole 50a is sometimes referred to as the Louvering structure.

The outlet 50 is formed on each flap 43, 44 where heat from the inside escapes outward through the outlet 50 and, in the event of an arc, each cover 43, 44 is opened and the arc escapes outward through the openings 41 and 42.

Meanwhile, viewed from the top, the heat discharge hole 50a is covered by the cover part 50b. Therefore, the intrusion of external dust or debris is minimized. In addition, outlets 50 and 51 formed on each cover 43, 44 do not travel in a direction perpendicular to each cover 43, 44 due to the cover part 50b, but are discharged in a direction parallel to each cover 43, 44.

Here, the cover part 50b is formed to open in one direction, so the direction of movement of the heat is guided in one direction.

The heat in the first region is emitted outward through the first outlet 50 of the first flap 43, and the heat in the second region is emitted through the second outlet 51 of the second flap 44. In other words, there is a discharge path where both the heat generated in the first region and the heat generated in the second region are appropriately discharged. (To distinguish each outlet, reference numbers are given and each outlet is to be separately explained by adding an appendix a, although not otherwise indicated on the drawings, and the cover is to be described by adding an appendix b.)

The cradle panel 36 has multiple third outlets 52 adjacent to the rear panel 34. The cover part 52b of the third outlet 52b is formed in such a way that it is convex to the top. Further, the openings in the cover part 52b of the third outlet 52b are formed towards the rear. Accordingly, the residual heat in the lower part of the first region (A) is transferred to the third region (C).

The terminal panel 35 has multiple outlets 53 at the bottom of the terminal bushing 38. Therefore, the heat in the first region is directed through the fourth outlet 53 to the second region. The fourth outlet 53 is formed such that the opening of the cover part 50b faces the outer lower part. Accordingly, it is advantageous to discharge the heat inside to the outside, preventing foreign substances from entering the inside.

The rear panel 34 is provided with a fifth outlet 54 at the bottom. The heat in the second region exits through the fifth outlet 54. In addition, as the fifth outlet 54 is placed at the same height as the fourth outlet 53, the heat exiting through the fourth outlet 53 from the first region exits through the fifth outlet 54. The fifth outlet 54 is formed such that the opening of the cover part 54b faces the outer lower part. Accordingly, it is advantageous to discharge the heat inside to the outside, preventing external dust from invading.

The lower panel 33 is provided with a sixth outlet 55 in the area adjacent to the fourth outlet 53. Heat exiting from the first region through the third outlet 52 and remaining heat in the third region is discharged through the sixth outlet 55.

Heat generated by the first breaker compartment 12 is discharged externally through each outlet 50-55.

Specifically, the heat in the first region is discharged upward through the first outlet 50, and then downward and rearward through the third outlet 52 and the fourth outlet 53.

The heat in the second region is discharged upward through the second outlet 51, and exiting rearward through the fifth outlet 54.

Heat from the third region is discharged downward through the 6th outlet 55.

At this time, each outlet 50-55b is equipped with a cover part 50b-55b to prevent as much foreign matter or dust as possible.

Describing again the application of each breaker compartment 12 and 13 formed in the above structure to the multi-stage distributing board is as follows.

Since the first breaker compartment 12 is installed in the first stage (bottom) of the distributing board, heat exiting through the first outlet (A50) from the first region (A) and the heat exiting through the second outlet (A51) from the second region (B) is discharged to the outside through the heat discharge chamber 20. In addition, the heat exiting through the sixth outlet A55 from the third region (C) is discharged to the lower side.

Since the second breaker compartment 13 is installed at the second stage (top), the heat exiting through the first outlet (B50) from the first region (A) and the heat exiting through the second outlet (B51) from the second region (B) is discharged to the top. In addition, the heat exiting through the sixth outlet (B55) from the third region (C) is discharged externally through the heat discharge chamber 20. Here, to distinguish between the outlet of the first breaker compartment 12 and the outlet of the second breaker compartment 13, the appendix A and B were used, respectively.

The heat drawn out of each breaker compartment 12 and 13 through the fifth outlet 54, is discharged into the adjacent chamber (e.g. the bus bar compartment) to reduce the temperature inside the breaker compartments 12 and 13.

Figure 6:
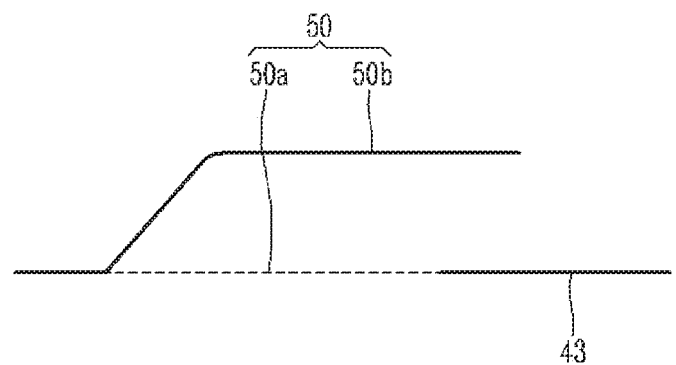
FIG. 6 is a partial sectional view of an outlet in accordance with one embodiment of the present disclosure.

Referring to FIG. 6, there is shown other embodiments applied to the outlet of the present disclosure. In this embodiment, the cover part 50b is formed longer than the length of the heat discharge hole 50a and fully covers the heat discharge hole 50a, while one end of the cover part 50b is extended to one side of the heat discharge hole 50a. As a result, dust proof performance can be improved further.

According to the heat exhaust and dustproof system of the multi-stage distributing board in accordance with the embodiments of the present disclosure, the outlet for each cover is prepared to effectively perform the heat discharge function under normal conditions.

In addition, the outlets are also provided on each panel, which is effective for heat discharge.

In addition, in the event of an arc, the flap is opened so that arc pressure and heat can be discharged within a short period of time.

In addition, the heat discharge holes formed in the flap are covered by the cover part, thereby minimizing introduction of foreign materials or water from the outside.

While the invention has been shown and described with reference to the foregoing preferred embodiments thereof, it will be understood by those skilled in the art that various changes and modifications may be made without departing from the spirit and scope of the invention as defined by the appended claims. Therefore, the embodiments disclosed in the present disclosure are not intended to limit the scope of the present disclosure but are merely illustrative, and it should be understood that the scope of the technical idea of the present disclosure is not limited by those embodiments. That is, the scope of protection of the present invention should be construed according to the appended claims, and all technical ideas within the scope of equivalents thereof should be construed as being included in the scope of the present invention.

What is claimed is:

1. A heat exhaust and dustproof system of a multi-stage distributing board, comprising:
   multiple compartments provided at an enclosure of a distributing board; and
   multiple flaps provided at each of the multiple compartments,
   wherein the flaps are provided with first multiple outlets for heat emission,
   wherein the multiple compartments include:
      a first region surrounded by an upper panel of an upper section, side panels of both sides, a terminal panel of a rear section, a cradle panel of a bottom side, and a breaker door of a front section;
      a second region surrounded by the upper panel, the side panels, a rear panel of the rear section, a lower panel of a lower section, the terminal panel of the front section; and
      a third region surrounded by the cradle panel, the side panels, the terminal panel of the rear section, the lower panel of the lower section, and the breaker door of the front section.

2. The system of claim 1, wherein the multiple compartments include a first compartment installed in a first stage and a second compartment installed in a second stage.

3. The system of claim 2, further comprising a heat discharge chamber installed between the first and second compartments, with openings formed on both sides of the heat discharge chamber.

4. The system of claim 1, wherein the multiple flaps include a first flap formed in the first and second regions of the first compartment, and the first flap is connected to the heat discharge compartment.

5. The system of claim 1, wherein each of the first multiple outlets includes a heat discharge hole formed at part of the multiple flaps and a cover part that covers the heat discharge hole.

6. The system of claim 5, wherein one end of the cover part is extended from one side of the heat discharge hole and the other end is separated from the other side of the heat discharge hole.

7. The system of claim 5, wherein each of the cradle panel, terminal panel, and rear panel includes second multiple outlets, wherein each of the second multiple outlets includes a heat discharge hole and a cover part that covers the heat discharge hole.

8. The system of claim 7, wherein the second multiple outlets formed on the terminal panel and the rear panel are formed such that the cover part of the second multiple outlets of the terminal panel and the real panel is protruded outward and an opening of the cover part of the second multiple outlets of the terminal panel and the real panel faces downward.

9. The system of claim 5, wherein a length of the cover part of the first multiple outlets is longer than a length of the heat discharge hole of the first multiple outlets.

* * * * *